(No Model.)
W. C. ANDREWS.
SETTLING OR STORAGE POND OR BASIN FOR PULVERIZED COAL.
No. 502,063.　　　　　　　　　　Patented July 25, 1893.
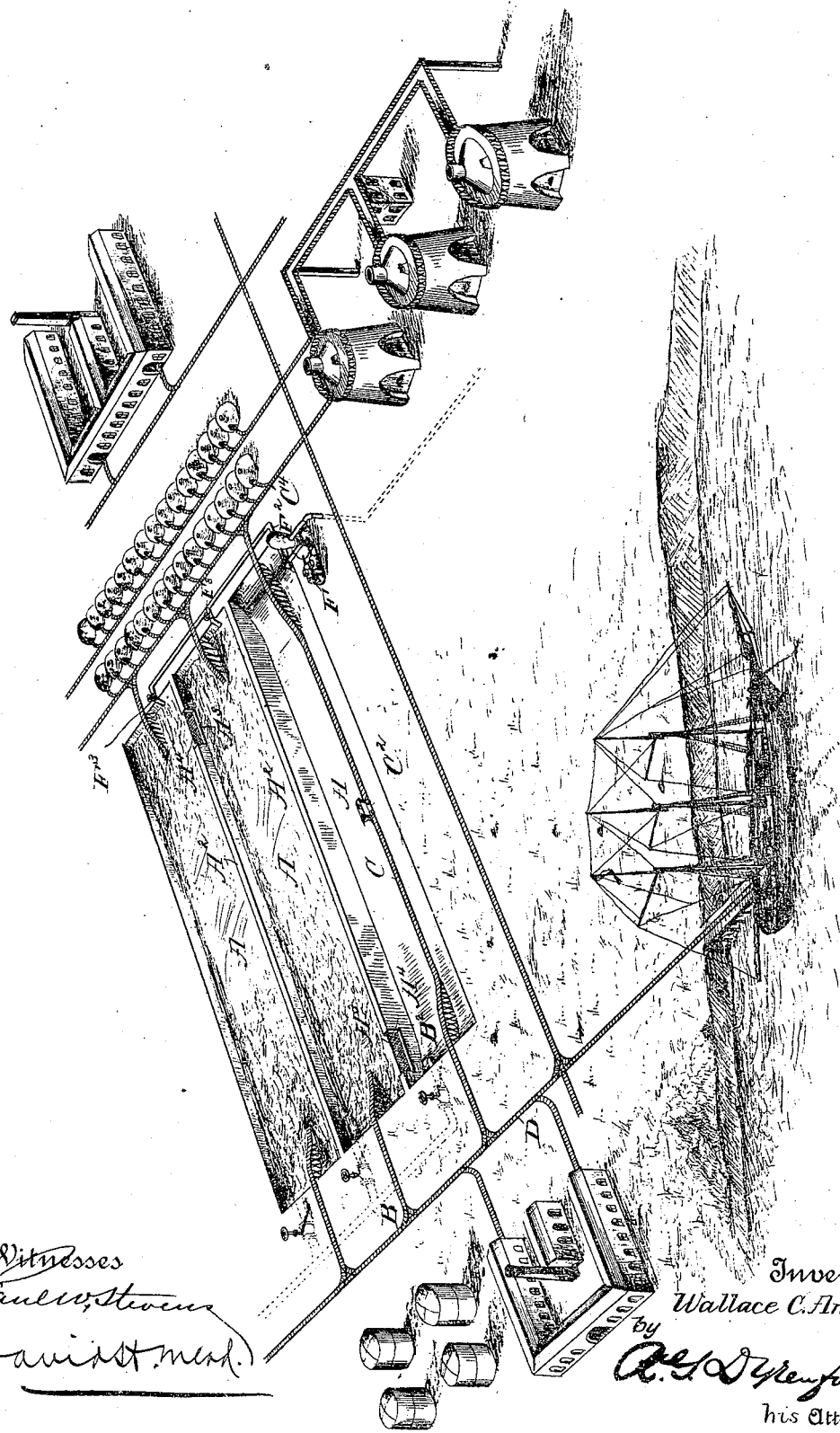
Witnesses
Inventor:
Wallace C. Andrews,
by
his Attorney.

United States Patent Office.

WALLACE C. ANDREWS, OF NEW YORK, N. Y.

SETTLING OR STORAGE POND OR BASIN FOR PULVERIZED COAL.

SPECIFICATION forming part of Letters Patent No. 502,063, dated July 25, 1893.

Application filed October 28, 1892. Serial No. 450,230. (No model.)

*To all whom it may concern:*

Be it known that I, WALLACE C. ANDREWS, a citizen of the United States, residing at New York, in the county of New York and State of New York, have invented certain new and useful Improvements in Settling or Storage Ponds or Basins for Pulverized Coal; and I do hereby declare the following to be a full, clear, and exact description of the invention, such as will enable others skilled in the art to which it appertains to make and use the same.

This invention relates to means for receiving a mixture of coal and water which has been transported through suitable pipes, and allowing the coal to be separated from the liquid and be removed with ease and dispatch for any desired uses.

The object of the invention is to produce means whereby a mixture of the kind referred to may be received, the solid matter be allowed to settle, the liquid be drawn off, and the solid matter be stored and be readily removed for use as desired.

With this object in view, the invention consists essentially in a suitable number of settling ponds or basins arranged in close proximity and communicating with each other, each pond or basin being provided with an inlet and an outlet, and having in it suitable railway tracks, it being designed to run cars on the tracks; furthermore, the invention resides in a number of settling ponds or basins arranged in close proximity, inlet pipes through which powdered coal mixed with water is received, outlets near the tops of the ponds or basins, weirs placed in the walls separating the ponds or basins and regulating the outlets, a pump for withdrawing the mixture from the last pond or basin, and tracks laid in the ponds or basins.

In the accompanying drawing, I have illustrated a settling or receiving station constructed in accordance with my invention, and showing communications between the settling or receiving ponds or basins and the places for utilizing or shipping the coal deposited for storage or settling.

In the drawing, A represents the ponds or basins which are formed in any desired or convenient manner, as by digging openings of suitable size in the ground, and where the nature of the soil requires, covering the bottoms and sides with cement or other suitable material which will present a suitable surface for retaining the liquid. If desired, the ponds or basins may be formed by building suitable bottoms, ends and dividing walls of wood, masonry, or the like, on the top of the ground or in an elevated position, the nature and construction of the ponds or basins being regulated by the requirements and characteristics of the location and the disposition to be made of their contents. The ponds or basins are preferably arranged closely together so that a dividing wall or partition $A^2$ may form a side of two basins. In each dividing wall is an opening $A^3$, which is regulated by a weir or gate $A^4$, whereby the levels of the water in the different basins may be regulated and governed. These gates or weirs are preferably placed near the ends of the separating walls or partitions in order to render them readily accessible.

B represents an inlet pipe or conduit through which powdered or pulverized coal mixed with water is conducted from a source of supply by pumping or otherwise. Branch pipes $B^2$, having suitable cocks connect the inlet pipe with the settling ponds or basins.

Through the center or other desired part of the ponds or basins A extend tracks C. These tracks enter the receptacles from the top and are depressed at a short distance from the top and then extend along the bottoms of the ponds or basins. By this arrangement, the removal of the coal from any level in the ponds or basins by cars $C^2$ is permitted.

Branch tracks D, $C^4$, are built to connect the tracks C with any suitable place of deposit or use of the coal, as for instance, to a vessel, to cars, to gas-works, to coke ovens, to blast furnaces, or to briquette factories, as desired.

On the bank or near the wall of the outer one of a series of ponds or basins is placed a pump F, by which the water in any one of the ponds or basins is conveyed away, that is to say, by which the water on the top is carried off. Branch pipes $F^3$ from a main pump-pipe $F^2$ lead from each pond or basin for this purpose. Flexible pipes may be attached to the ends of the branch pipes, facilitating the removal of water from any part of the tank.

The operation is as follows: At first the mixture is led into the first basin, whence there is overflow into the second, and thence into the next, and so on; when the first basin is sufficiently filled with coal, the feed to it is shut off, the feed to the second is opened, and the pump is started to draw off the supernatant water from the first after the coal has settled. The coal is then taken from the first, when the second basin is full, the feed to it is stopped, the weir between it and the next basin closed and the supply pipe regulated to shut off the supply to the second and to turn it on to fill the third basin or pond. From the arrangement shown, it will be clear that the plant may be operated continuously, for the reason that the contents of the first basin or pond can be settled and removed by the time the last basin is filled with the mixture.

Having thus fully described my invention, what I claim as new, and desire to secure by Letters Patent, is—

1. The means of providing for the storage and settling of pulverized coal, suspended in water, which consists in a suitable number of settling ponds or basins arranged in close proximity and connected with each other, each pond or basin being provided with an inlet and an outlet and having in it a railway track, substantially as described.

2. The means of providing for the storage and settling of pulverized coal, suspended in water, consisting of settling ponds or basins arranged in close proximity, inlet pipes through which the powdered coal mixed with water is supplied, outlets near the tops of the ponds or basins, weirs placed in the walls separating the ponds or basins and regulating the outlets, a pump for drawing the water from the ponds, or basins, and tracks leading along the bottoms of the ponds or basins, substantially as described.

In testimony whereof I affix my signature in presence of two witnesses.

WALLACE C. ANDREWS.

Witnesses:
W. F. WEISS,
HERMANN SEMMEL.